(12) United States Patent
Shu

(10) Patent No.: US 10,489,494 B2
(45) Date of Patent: Nov. 26, 2019

(54) METHOD AND APPARATUS FOR ADJUSTING AN INPUT BOX IN A DISPLAY SCREEN DURING THE SWITCH OF DISPLAY MODE

(71) Applicant: TENCENT TECHNOLOGY (SHENZHEN) COMPANY LIMITED, Guangdong (CN)

(72) Inventor: Yuqiang Shu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 626 days.

(21) Appl. No.: 14/809,057

(22) Filed: Jul. 24, 2015

(65) Prior Publication Data

US 2015/0331840 A1 Nov. 19, 2015

Related U.S. Application Data

(63) Continuation of application No. PCT/CN2014/073081, filed on Mar. 7, 2014.

(30) Foreign Application Priority Data

Mar. 8, 2013 (CN) .......................... 2013 1 0073955

(51) Int. Cl.
*G06F 17/22* (2006.01)
*G06F 3/0481* (2013.01)
(Continued)

(52) U.S. Cl.
CPC ........ *G06F 17/2247* (2013.01); *G06F 3/0481* (2013.01); *G06F 9/451* (2018.02); *G06F 16/9577* (2019.01)

(58) Field of Classification Search
None
See application file for complete search history.

(56) References Cited

U.S. PATENT DOCUMENTS 7,036,086 B2 * 4/2006 Cobbley ............... G06F 3/0481
715/744
2004/0119750 A1 * 6/2004 Harrison ............ G06F 3/04886
715/773
(Continued)

FOREIGN PATENT DOCUMENTS

CN 101741969 A 6/2010
CN 102364424 A 2/2012
(Continued)

OTHER PUBLICATIONS

The World Intellectual Property Organization (WIPO) International Search Report for PCT/CN2014/073081 dated Jun. 30, 2014 3 Pages.
(Continued)

*Primary Examiner* — Howard Cortes
(74) *Attorney, Agent, or Firm* — Anova Law Group, PLLC

(57) ABSTRACT

A method and apparatus for adjusting an input box in a display screen is provided, the method includes the following steps: detecting whether a display mode of the display screen is switched; upon detecting the display mode of the display screen is switched, obtaining a position of an input box in a webpage; and if the input box is outside a webpage viewable area of the display screen, adjusting the webpage and a canvas of the webpage in accordance with a distance between the input box and the webpage viewable area, wherein the adjusted input box is within the webpage viewable area.

12 Claims, 8 Drawing Sheets

(51) Int. Cl.
  *G06F 9/451*   (2018.01)
  *G06F 16/957*  (2019.01)

(56) References Cited

U.S. PATENT DOCUMENTS

| | | | |
|---|---|---|---|
| 2005/0099407 A1 | 5/2005 | Pennington et al. | |
| 2007/0234206 A1 | 10/2007 | Yamabuchi et al. | |
| 2007/0271085 A1* | 11/2007 | Hamdi | G06F 8/51 703/27 |
| 2007/0300162 A1* | 12/2007 | Goto | G06F 17/30899 715/745 |
| 2008/0055273 A1* | 3/2008 | Forstall | G06F 3/04817 345/173 |
| 2009/0267910 A1* | 10/2009 | Tsuei | G06F 3/0485 345/173 |
| 2010/0023855 A1* | 1/2010 | Hedbor | G06F 17/30905 715/234 |
| 2010/0156798 A1* | 6/2010 | Archer | G06F 3/017 345/169 |
| 2010/0241983 A1* | 9/2010 | Walline | G06F 1/1626 715/773 |
| 2011/0119620 A1* | 5/2011 | Schon | G06F 3/0416 715/785 |
| 2011/0167366 A1* | 7/2011 | Wagner | G06F 3/0483 715/765 |
| 2011/0302520 A1* | 12/2011 | Yuasa | G06F 3/04886 715/773 |
| 2012/0117501 A1* | 5/2012 | Koch | G06F 3/04886 715/769 |
| 2013/0021377 A1* | 1/2013 | Doll | G09G 5/14 345/649 |
| 2013/0097526 A1* | 4/2013 | Stovicek | G06Q 10/107 715/752 |
| 2013/0147717 A1* | 6/2013 | Yamada | G06F 3/02 345/168 |
| 2013/0229334 A1* | 9/2013 | Kim | G06F 3/04895 345/156 |
| 2013/0283195 A1* | 10/2013 | Bilgen | G06F 3/0485 715/767 |
| 2013/0326392 A1* | 12/2013 | Maltesson | G06F 3/0488 715/780 |
| 2014/0022285 A1* | 1/2014 | Stovicek | G06F 1/1694 345/650 |
| 2014/0223280 A1* | 8/2014 | Choudhury | G06F 3/0485 715/234 |
| 2015/0169567 A1* | 6/2015 | Singh | G06F 16/51 707/722 |
| 2015/0253985 A1* | 9/2015 | Siegman | G06F 3/04886 715/773 |

FOREIGN PATENT DOCUMENTS

| | | |
|---|---|---|
| CN | 102368193 A | 3/2012 |
| EP | 1764673 A1 | 3/2007 |

OTHER PUBLICATIONS

The State Intellectual Property Office of the People's Republic of China (SIPO) Office Action 1 for 201310073955.5 dated Nov. 16, 2017 6 Pages (including translation).

* cited by examiner

METHOD AND APPARATUS FOR ADJUSTING AN INPUT BOX IN A DISPLAY SCREEN DURING THE SWITCH OF DISPLAY MODE

CROSS-REFERENCE TO RELATED APPLICATIONS

This application is a continuation of International Patent Application No. PCT/CN2014/073081, entitled "Method and Apparatus for Adjusting an Input Box in a Display Screen during the Switch of Display Mode," filed on Mar. 7, 2014. This application claims the benefit and priority of Chinese Patent Application No. 201310073955.5, entitled "Method and Apparatus for Adjusting an Input Box in a Display Screen during the Switch of Display Mode," filed on Mar. 8, 2013. The entire disclosures of each of the above applications are incorporated herein by reference.

TECHNICAL FIELD

The present invention relates to Internet technologies, and more particularly, to a method and apparatus for adjusting an input box in a display screen during the switch of display mode.

BACKGROUND

With the development of Internet technologies, more and more people are using mobile terminals, such as tablets or cellphones, to browse the Internet, which is particularly convenient for the user.

When people uses a tablet or a cellphone to browse the Internet, the screen of the tablet or the cellphone is often rotated to get a better display effect, resulting the switch between the portrait mode and the landscape mode. When the display mode of the screen is switched, the input area and the webpage viewable area of the screen will need to be redefined, and sometime an input box originally in the webpage viewable area can be outside of the webpage viewable area, which causes inconvenience to the user.

FIG. 1A is an exemplary schematic diagram of a display screen in portrait mode. FIG. 1B is an exemplary schematic diagram of a display screen in landscape mode. FIG. 1C is another exemplary schematic diagram of a display screen in landscape mode. As shown in FIGS. 1A-1C, the display screen 11 includes an input area 111 and a webpage viewable area 112. Part of webpage 12 is displayed on the display screen 11, including an input box 121. A soft keyboard (not shown) may be displayed in the input area for inputting data into the input box 121.

As shown in FIG. 1A, when the display screen 11 is in the portrait mode, the input box 121 is within the webpage viewable area 112, and the user can see the characters inputted through the software keyboard in the input area 111. When the display screen is rotated, and the display module switches to the landscape mode, the input box can be in the input area 111 and covered by the soft keyboard as shown in FIG. 1B, or even outside the display screen. As a result, the user cannot see the characters being inputted, and may have to manually adjust the webpage so that the input box 121 is within the webpage viewable area 112 of the display screen 11, which causes inconvenience to the user. Please note that FIG. 1A and the related description above are background information related to the present invention, and are not necessarily disclosed in the prior art.

SUMMARY OF THE INVENTION

The embodiments of the present invention provide a method and apparatus for adjusting an input box in a display screen during the switch of display mode that address the issue in the prior art where the input box is not being properly adjusted the switch of display mode, causing inconvenience to the user.

In accordance with embodiments of the present invention, a method for adjusting an input box in a display screen is provided, the method comprising: detecting whether a display mode of the display screen is switched; upon detecting the display mode of the display screen is switched, obtaining a position of an input box in a webpage; and if the input box is outside a webpage viewable area of the display screen, adjusting the webpage in accordance with a distance between the input box and the webpage viewable area so that the adjusted input box is within the webpage viewable area.

In accordance with embodiments of the present invention, a method for adjusting an input box in a display screen is provided, the method comprising: detecting whether a display mode of the display screen is switched; upon detecting the display mode of the display screen is switched, obtaining a position of an input box in a webpage; and if the input box is outside a webpage viewable area of the display screen, adjusting the webpage and a canvas of the webpage in accordance with a distance between the input box and the webpage viewable area so that the adjusted input box is within the webpage viewable area.

In accordance with embodiments of the present invention, an apparatus for adjusting an input box in a display screen is provided, comprising: a display mode detection module for detecting whether a display mode of the display screen is switched; a position acquisition module for, upon display mode detection module detecting the display mode of the display screen is switched, obtaining a position of an input box in a webpage; and an adjustment module for, if the input box is outside a webpage viewable area of the display screen, adjusting the webpage in accordance with a distance between the input box and the webpage viewable area so that the adjusted input box is within the webpage viewable area.

In accordance with embodiments of the present invention, an apparatus for adjusting an input box in a display screen is provided, comprising: a display mode detection module for detecting whether a display mode of the display screen is switched; a position acquisition module for, upon display mode detection module detecting the display mode of the display screen is switched, obtaining a position of an input box in a webpage; and an adjustment module for, if the input box is outside a webpage viewable area of the display screen, adjusting the webpage and a canvas of the webpage in accordance with a distance between the input box and the webpage viewable area so that the adjusted input box is within the webpage viewable area.

In accordance with embodiments of the present invention, when the display mode of a display screen is switched, the webpage is automatically adjusted in accordance with the distance between the input box and the webpage viewable area so that the input box is within the webpage viewable area, which improves the user's web browsing experience, and addresses the issue in the prior art where the input box is not being properly adjusted during the switch of display mode, causing inconvenience to the user.

BRIEF DESCRIPTION OF THE DRAWINGS

To better illustrate the technical features of the embodiments of the present invention, various embodiments of the present invention will be briefly described in conjunction with the accompanying drawings.

FIG. 1A is an exemplary schematic diagram of a display screen in portrait mode.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

Figure 2:
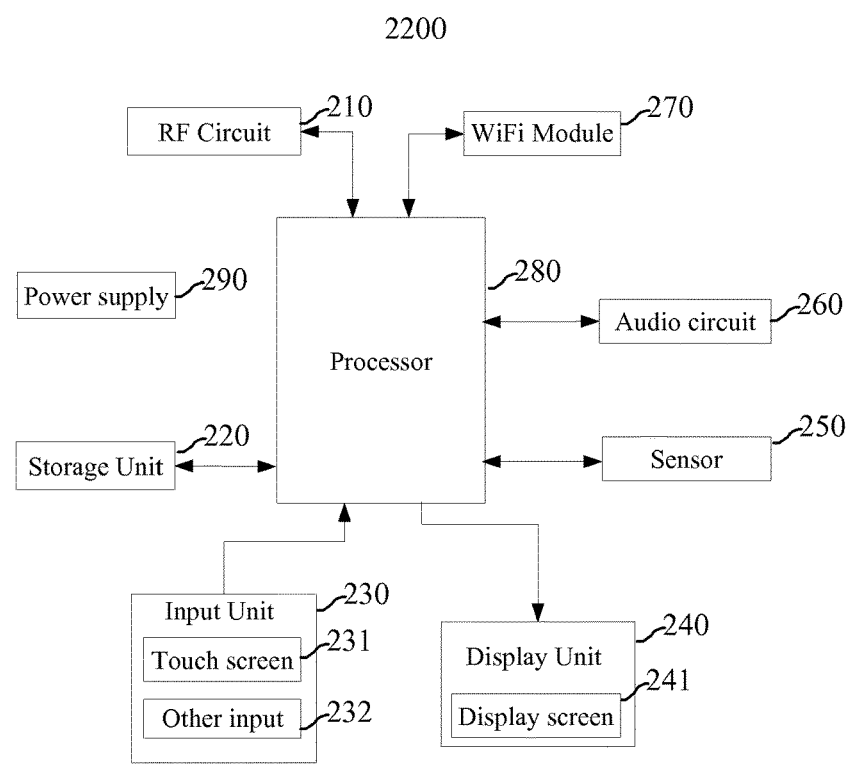
FIG. 2 is an exemplary schematic diagram for a terminal device in accordance with an embodiment of the present invention.

FIG. 2 is an exemplary schematic diagram for a terminal device in accordance with an embodiment of the present invention. The electronic device 2200 here can be used to implement the method for adjusting an input box in a display screen in accordance with the embodiments of the present invention.

The electronic device 2200 can be a smart phones, a tablet computer, an e-reader, an MP4 (Moving Picture Experts Group Audio Layer IV) Player, a laptop computer or a desktop computer. The electronic device 2200 include an RF circuit 210, one or more computer-readable storage medium or storage unit 220, an input unit 230, a display unit 240, a sensor 250, an audio circuit 260, and a WiFi module 270, a processor 280, and a power supply 290. Those skilled in the art will understand that the electronic device could include more or less components that those illustrated in FIG. 2.

The RF circuit 210 can be used to send and receive signals to the processor 280 or a base station during data transmission and/or audio communication.

The storage unit 220 can be used to store software programs and modules, which can be executed by the processor 280 to perform a variety of functions and data processing.

The input unit 230 can be used to receive the input of numeric or character information, or to receive signal from system input or control devices such as keyboard, mouse, joystick, or optical trackball. Specifically, the input unit 230 can include a touch screen 231 and other input device 232.

The display unit 240 can be used to display information entered by a user or provided to the users on a graphical user interface, which can include graphs, texts, icons, videos, and the combination thereof. The display unit can include a display screen 241, which can be a Liquid Crystal Display (LCD) or an Organic Light-Emitting Diode (OLED) screen. In addition, the touch screen 231 can be configured to cover the display screen 241.

The electronic device 2200 may also include at least one sensor 250, such as a light sensor, a motion sensor or other sensors.

The audio circuit 260 provides the electronic device 2200 with an audio interface, and can be used to process audio data.

The WiFi module 270 can be used to establish a WiFi connection for the electronic device 2200, which is a wireless connection for providing Internet access over a short distance.

The processor 280 is the control center of the electronic device 2200. The processor 280 is connected to the various components of the electronic devices through various interface and wires, and executes the software programs and modules stored in storage unit 220 to perform a variety of functions and data processing.

The electronic device 2200 also includes a power source 290, such as a battery. Specifically, the display unit 240 in the electronic device 2200 is a touch screen, the storage unit 220 stores software programs and modules that correspond to the apparatuses for adjusting an input box in a display screen in accordance with the embodiments of the present invention, and the processor 280 executes the software programs and modules to perform the methods for adjusting an input box in a display screen in accordance with the embodiments of the present invention.

Figure 3:
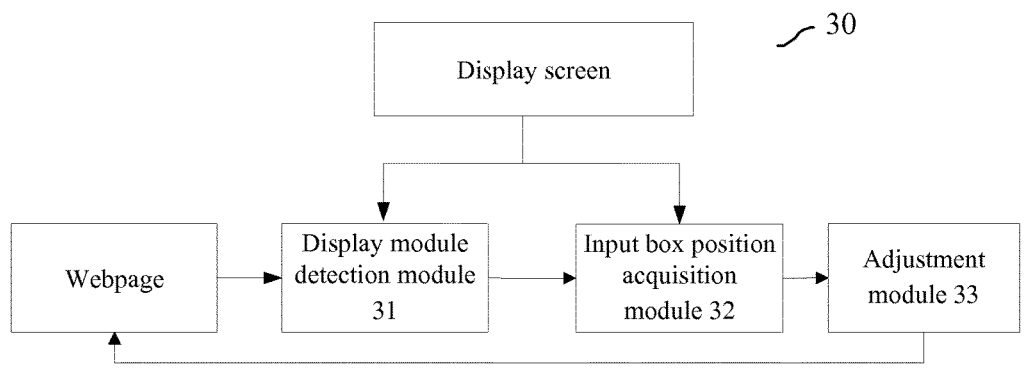
FIG. 3 is an exemplary schematic diagram for an apparatus for adjusting an input box in a display screen in accordance with an embodiment of the present invention.

FIG. 3 is an exemplary schematic diagram for an apparatus for adjusting an input box in a display screen in accordance with an embodiment of the present invention. As shown in FIG. 3, the apparatus 30 for adjusting an input box in a display screen is part of the electronic device 2200, and includes a display mode detection module 31, a position acquisition module 32, and an adjustment module 33. The display mode detection module 31 is used for detecting whether a display mode of the display screen is switched; the position acquisition module 32 is used for, upon display mode detection module detecting the display mode of the display screen is switched, obtaining a position of an input box in a webpage; and the adjustment module 33 is used for, if the position acquisition module 32 detects that the input box is outside a webpage viewable area of the display screen, adjusting the webpage in accordance with a distance between the input box and the webpage viewable area so that the adjusted input box is within the webpage viewable area; if the position acquisition module 32 detects that the input box is within the webpage viewable area, not adjusting the webpage.

The distance between the input box and the webpage viewable area can be the distance between a select point of the input box and a select point of the webpage viewable area that can be used to represent the relative position of the input box and the webpage viewable area. During the process of adjusting the input box, the relative position of the select point within the input box or the webpage viewable area is kept constant. The select point can be on the upper edge, lower edge, or in the middle of the input box or the webpage viewable area, and is not limited to any particular position.

Figure 4:
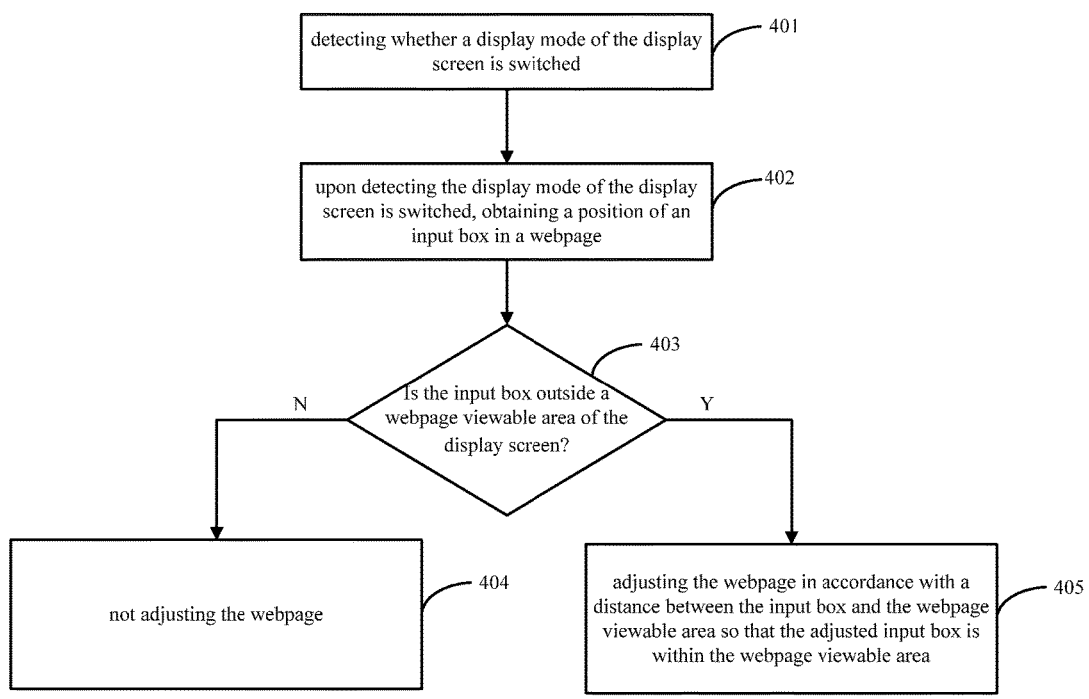
FIG. 4 is an exemplary flowchart for a method for adjusting an input box in a display screen in accordance with an embodiment of the present invention.

The operational principle for the apparatus for adjusting an input box in a display screen in this embodiment will be described in connection with FIG. 4, which is an exemplary flowchart for a method for adjusting an input box in a display screen in accordance with an embodiment of the present invention. As shown in FIG. 4, the method for adjusting an input box in a display screen includes the following steps.

Step 401: detecting whether a display mode of the display screen is switched.

Step 402: upon detecting the display mode of the display screen is switched, obtaining a position of an input box in a webpage.

Step 403: determining if the input box is outside a webpage viewable area of the display screen, and if not, proceeding to Step 404, otherwise, proceeding to Step 405.

Step 404: not adjusting the webpage.

Step 405: adjusting the webpage in accordance with a distance between the input box and the webpage viewable area so that the adjusted input box is within the webpage viewable area.

The method for adjusting an input box in a display screen in this embodiment completes at Step 404 or 405.

Figure 5:
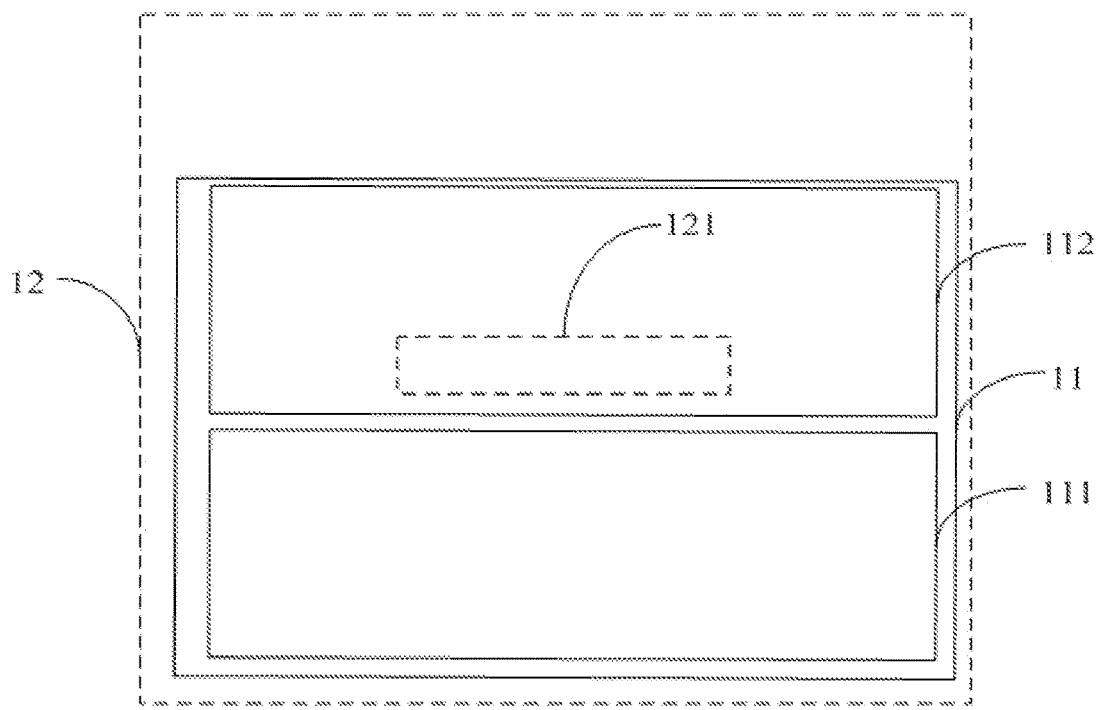
FIG. 5 is an exemplary schematic diagram of a display screen in landscape mode.
Figure 6:
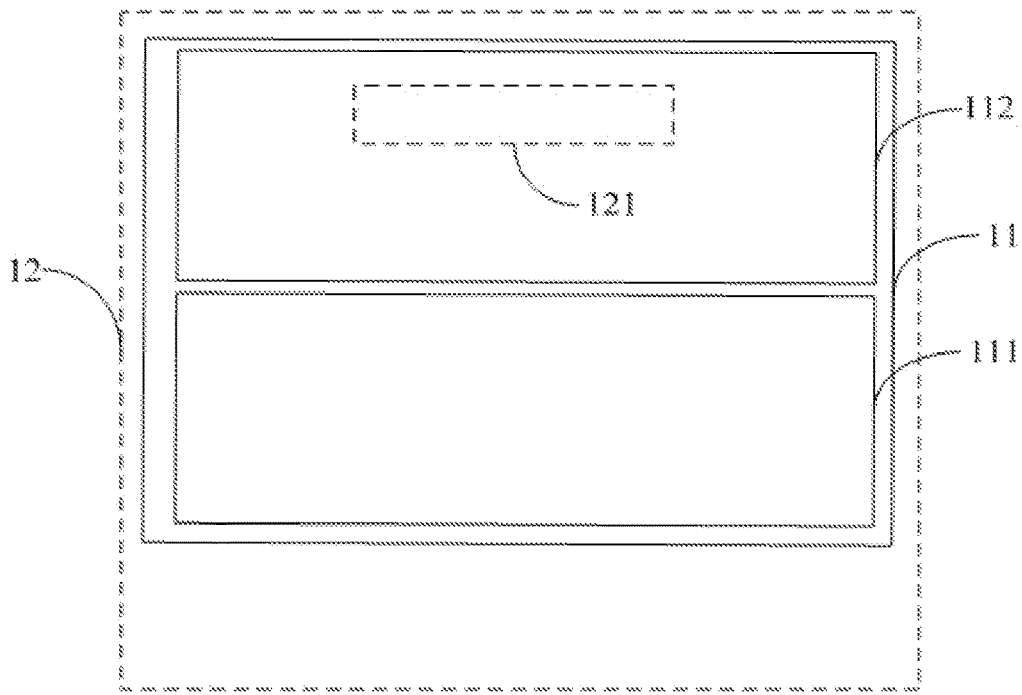
FIG. 6 is another exemplary schematic diagram of a display screen in landscape mode.

Each step in the method for adjusting an input box in a display screen in this embodiment will be described further in connection with FIGS. 1B, 1C, 5, and 6. FIG. 5 is an exemplary schematic diagram of a display screen in landscape mode after being adjusted using the method in FIG. 4. FIG. 6 is another exemplary schematic diagram of a display screen in landscape mode using the method in FIG. 4.

In Step 401, the display mode detection module 31 detects whether a display mode of the display screen is switched. The switch of the display mode can be caused by the rotation of the display screen, or the change of the resolution of the display screen.

Step 402 is performed next.

Figure 1A:
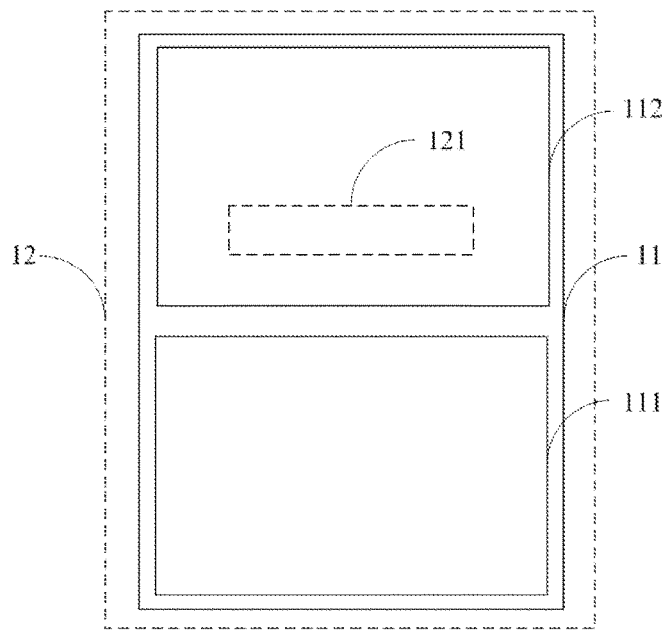
FIG. 1B is an exemplary schematic diagram of a display screen in landscape mode.
FIG. 1C is another exemplary schematic diagram of a display screen in landscape mode.
Figure 1B:
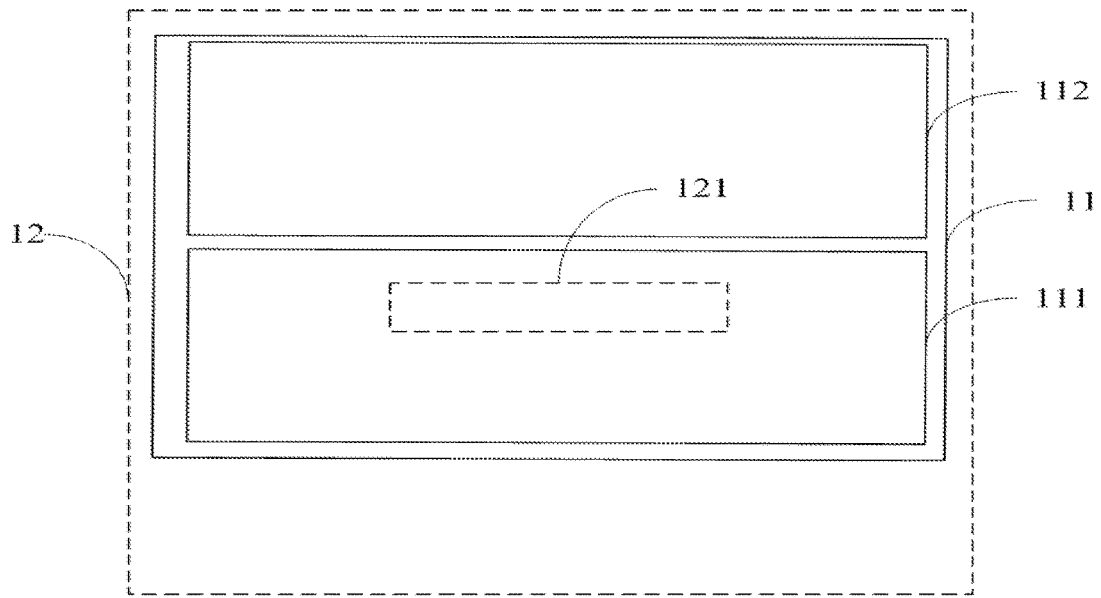
Figure 1C:
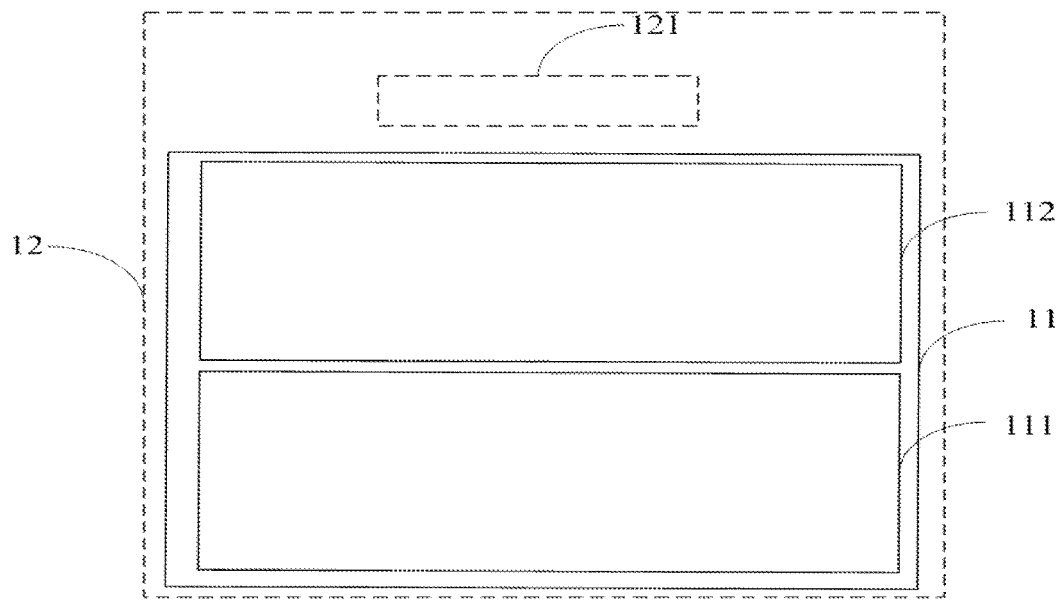

In Step 402, if display mode detection module 31 detects that the display mode of the display screen is switched in Step 401, the position acquisition module 32 obtains the position of the input box 121 in the webpage 12. The position of the input box 121 can be determined by the position of the vertices of the input box 121. For example, in FIG. 1B, the input box 121 is detected to be in the input area 111 of the display screen 11, and covered by a soft keyboard in the input area 111. In FIG. 1C, the input box 121 is outside the display screen 11.

Step 403 is performed next.

In Step 403, if the position acquisition module 32 determines that the input box 121 is outside the webpage viewable area 112 of the display screen 11, Step 405 is performed next; if the position acquisition module 32 determines that the input box 121 is within the webpage viewable area 112 of the display screen 11, Step 404 is performed next.

In Step 404, as the position acquisition module 32 determines that the input box 121 is within the webpage viewable area 112 of the display screen 11, and does not cause inconvenience to the user inputting characters, so the adjustment module 33 does not adjust the webpage 12.

In Step 405, the adjustment module 33 automatically adjusts the webpage 12 in accordance with a distance between the input box and the webpage viewable area, i.e., drugs the webpage 12 so that the input box 121 moves toward the webpage viewable area 112, and the adjusted input box 121 is within the webpage viewable area 112 of the display screen 11. Note the edge of the webpage 12 cannot be moved inside the display screen 11. In FIG. 1B, the input box 121 is in the input area 111, and the webpage 12 is moved up with respective to the display screen 11 so that the adjusted input box 121 is within the webpage viewable area 112 of the display screen 11 as shown in FIG. 5. In FIG. 1C, the input box 121 is outside the display screen 11, and the webpage 12 is moved down with respective to the display screen 11 so that the adjusted input box 121 is within the webpage viewable area 112 of the display screen 11 as shown in FIG. 6.

Preferably, in Step 405, the adjustment module 33 adjusts the webpage 12 so that the adjusted input box 121 is at a preset position of the webpage viewable area 112 of the display screen 11, such as the lower side of the webpage viewable area 112 as shown in FIG. 5 or the upper side of the webpage viewable area 112 as shown in FIG. 6, that minimizes the interference with the user's viewing of the webpage and enhances the user's web browsing experience.

The method for adjusting an input box in a display screen in this embodiment completes here.

In accordance with this embodiment of the present invention, when the display mode of a display screen is switched, the adjustment module 33 automatically adjusts the webpage in accordance with the distance between the input box and the webpage viewable area so that the input box is within the webpage viewable area, which improves the user's web browsing experience.

Figure 7:
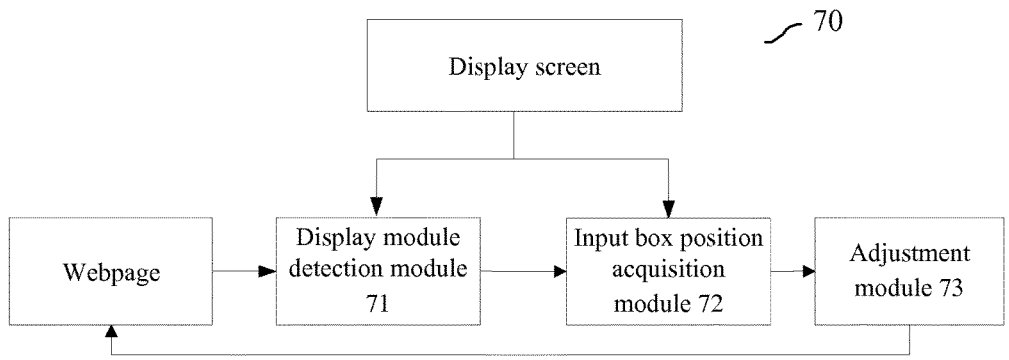
FIG. 7 is an exemplary schematic diagram for an apparatus for adjusting an input box in a display screen in accordance with another embodiment of the present invention.

FIG. 7 is an exemplary schematic diagram for an apparatus for adjusting an input box in a display screen in accordance with another embodiment of the present invention. As shown in FIG. 7, the apparatus 30 for adjusting an input box in a display screen is part of the electronic device 2200, and includes a display mode detection module 71, a position acquisition module 72, and an adjustment module 73. The display mode detection module 71 is used for detecting whether a display mode of the display screen is switched; the position acquisition module 72 is used for, upon display mode detection module detecting the display mode of the display screen is switched, obtaining a position of an input box in a webpage; and the adjustment module 73 is used for, if the position acquisition module 72 detects that the input box is outside a webpage viewable area of the display screen, adjusting the webpage and canvas of the webpage in accordance with a distance between the input box and the webpage viewable area so that the adjusted input box is within the webpage viewable area; if the position acquisition module 72 detects that the input box is within the webpage viewable area, not adjusting the webpage.

Figure 8:
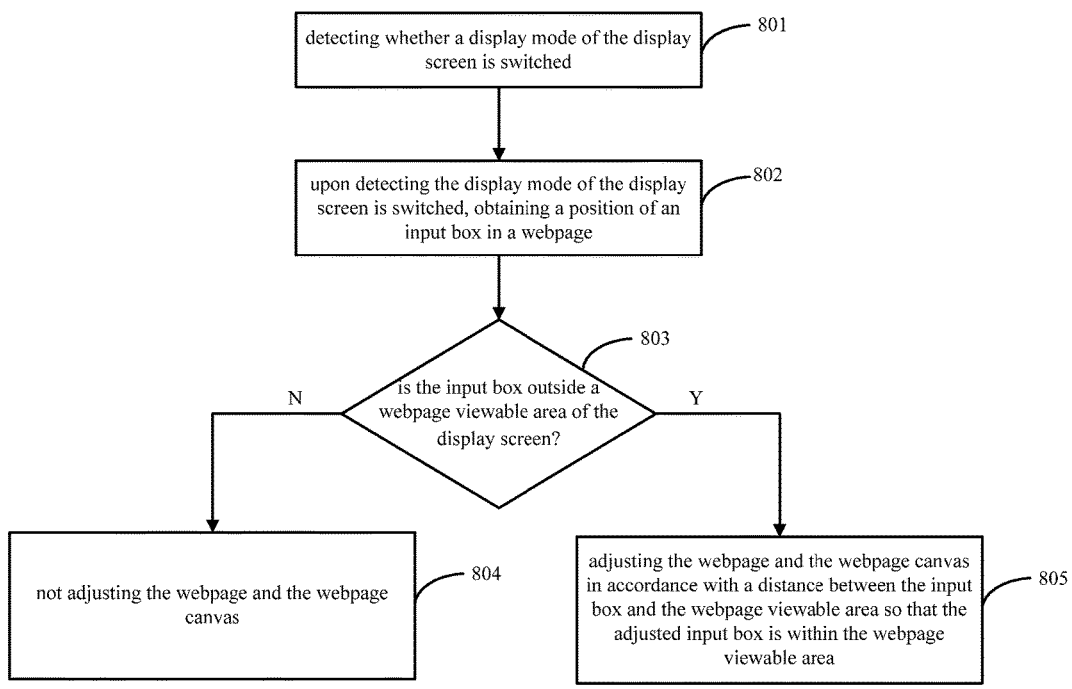
FIG. 8 is an exemplary flowchart for a method for adjusting an input box in a display screen in accordance with another embodiment of the present invention.

The operational principle for the apparatus for adjusting an input box in a display screen in this embodiment will be described in connection with FIG. 8, which is an exemplary flowchart for a method for adjusting an input box in a display screen in accordance with another embodiment of the present invention. As shown in FIG. 8, the method for adjusting an input box in a display screen includes the following steps.

Step 801: detecting whether a display mode of the display screen is switched.

Step 802: upon detecting the display mode of the display screen is switched, obtaining a position of an input box in a webpage.

Step 803: determining if the input box is outside a webpage viewable area of the display screen, and if not, proceeding to Step 804, otherwise, proceeding to Step 805.

Step 804: not adjusting the webpage.

Step 805: adjusting the webpage and the canvas of the webpage in accordance with a distance between the input box and the webpage viewable area so that the adjusted input box is within the webpage viewable area.

The method for adjusting an input box in a display screen in this embodiment completes at Step 804 or 805.

Figure 9A:
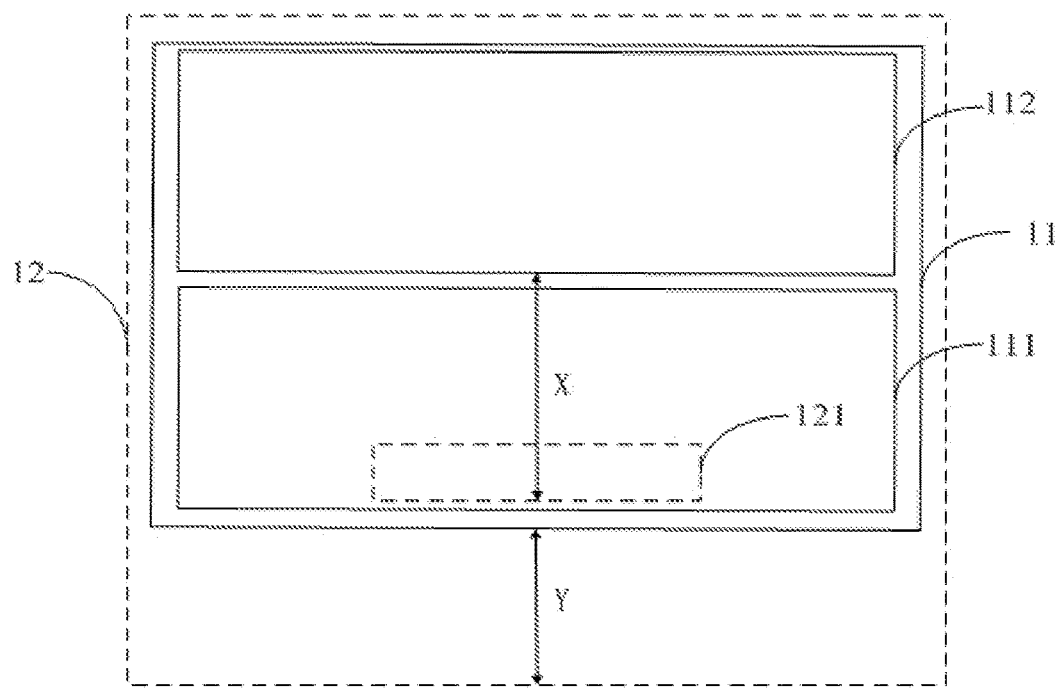
FIGS. 9A-9C are exemplary schematic diagrams of a display screen in landscape mode.

Each step in the method for adjusting an input box in a display screen in this embodiment will be described further in connection with FIGS. 9A-9C, which are exemplary schematic diagrams of a display screen in landscape mode after being adjusted using the method in FIG. 8.

In Step 801, the display mode detection module 71 detects whether a display mode of the display screen is switched. The switch of the display mode can be caused by the rotation of the display screen, or the change of the resolution of the display screen.

Step 802 is performed next.

In Step 802, if display mode detection module 71 detects that the display mode of the display screen is switched in Step 801, the position acquisition module 72 obtains the position of the input box 121 in the webpage 12. The position of the input box 121 can be determined by the position of the vertices of the input box 121. For example, in FIG. 9A, the input box 121 is detected to be in the input area 111 of the display screen 11, and covered by a soft keyboard in the input area 111.

Step 803 is performed next.

In Step 803, if the position acquisition module 72 determines that the input box 121 is outside the webpage viewable area 112 of the display screen 11, Step 805 is performed next; if the position acquisition module 72 determines that the input box 121 is within the webpage viewable area 112 of the display screen 11, Step 804 is performed next.

In Step 804, as the position acquisition module 72 determines that the input box 121 is within the webpage viewable area 112 of the display screen 11, and does not cause inconvenience to the user inputting characters, so the adjustment module 73 does not adjust the webpage 12.

In Step 805, the adjustment module 73 automatically adjusts the webpage 12 in accordance with a distance between the input box and the webpage viewable area, i.e., drugs the webpage 12 so that the input box 121 moves toward the webpage viewable area 112 in a similar fashion as in Step 405 of the above embodiment.

Figure 9B:
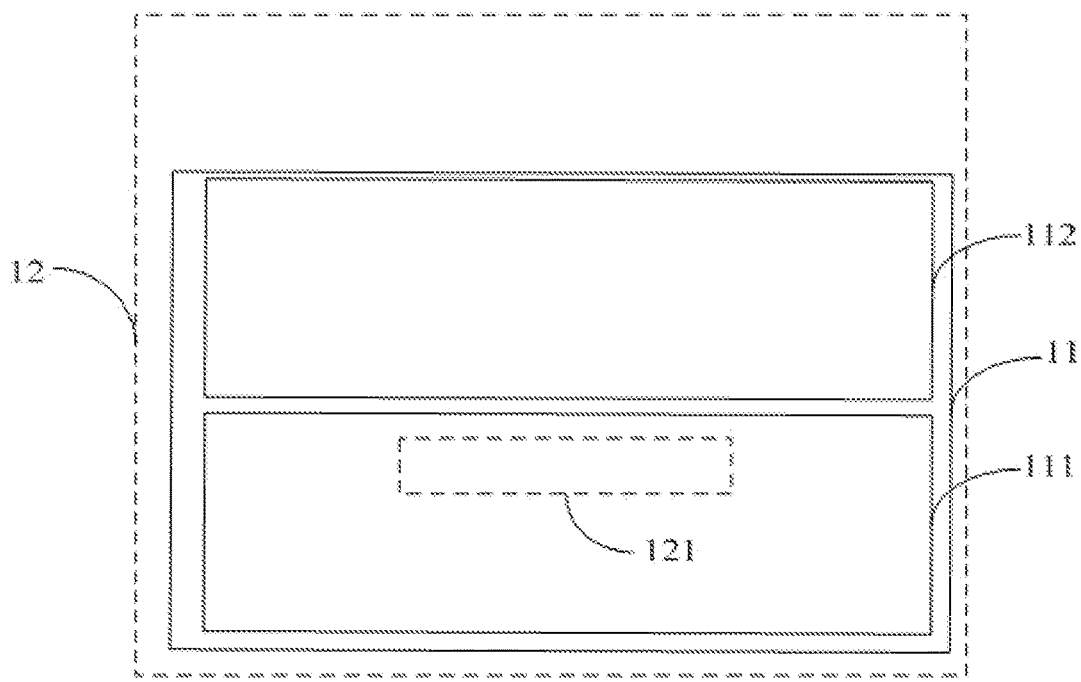
Figure 9C:
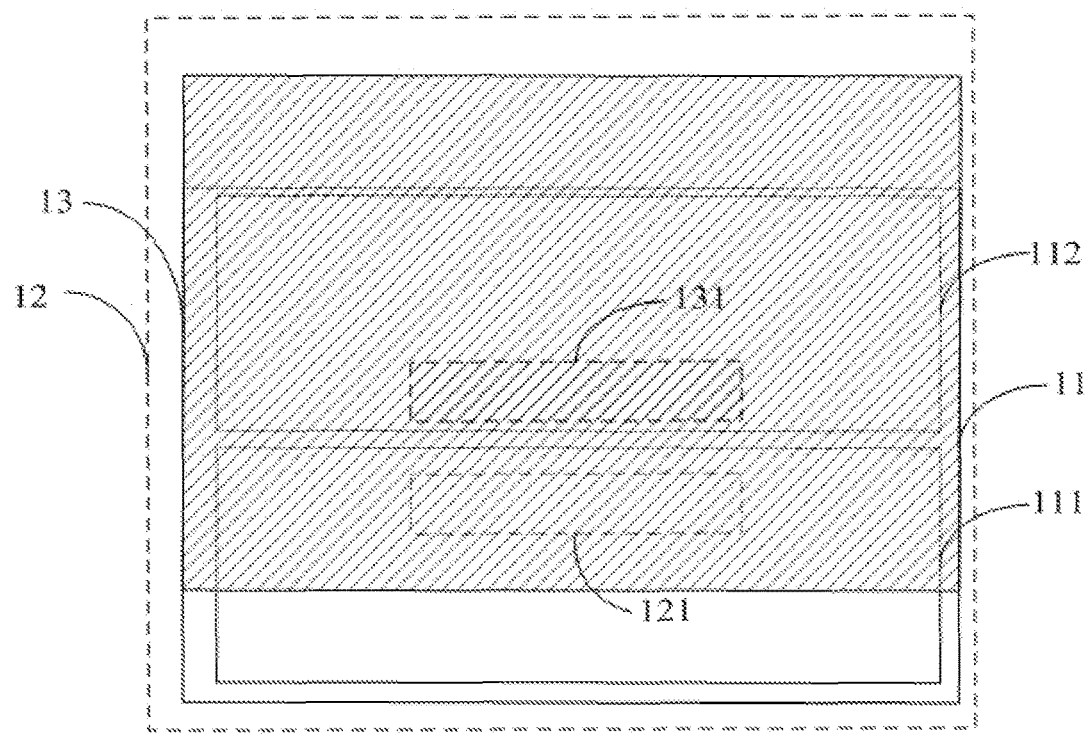

However, in this embodiment, due to fact that the edge of the webpage 12 cannot be moved inside the display screen 11, it is possible that the situation as shown in FIG. 9B will occur, wherein no matter how the adjustment module 73 adjust the webpage 12, the adjusted input box 121 is still outside the webpage viewable area 112 of the display screen 11. In such situation, the adjustment module 73 can automatically adjust the position of the webpage canvas 13 so that the input box 131 on the webpage canvas 13 moves toward the webpage viewable area 112, and the adjusted input box 131 on the canvas 13 is within the webpage viewable area 112 of the display screen 11. Here, the webpage canvas 13 is the content of the webpage that was drawn on the display screen 11, which can be adjusted within the display screen 11 so that the edge of the webpage canvas 13 is within the display screen 11, but only the content of the webpage that was previously drawn on the display screen can be moved. FIG. 9C is an exemplary schematic diagrams of a display screen in landscape mode after the webpage canvas 13 is adjusted, wherein the webpage is in the same position as in FIG. 9B, but the webpage canvas 13 is moved up with respective to the webpage 12 and the display screen 11, so that the input box 131 on the webpage canvas is within the webpage viewable area 112 of the display screen 11.

Preferably, as the adjustment of the webpage canvas 13 can potentially reduce the amount of webpage content that the user can see so that portion of the display screen 11 does not contain any webpage content, the adjustment of the webpage canvas 13 should be minimized. In adjusting the position of the input box 121, the webpage 12 should be adjusted first to minimize the adjustment of the webpage canvas 13.

Preferably, the adjustment module 73 first determines a maximum distance that the webpage 12 can be adjusted along an adjustment direction, then determines a distance to be adjusted along the adjust direction for the webpage canvas 13 in accordance with the distance between the input box 121 and the webpage viewable area 111, and the maximum distance. Here the adjustment direction is the direction that the input box 121 is adjusted with respect to the webpage viewable area 111, such as the direction between two points used to calculated the adjustment distance.

As shown in FIG. 9A, the distance between the pre-adjusted input box 121 in webpage 12 and the webpage viewable area 111 can be defined as X, the maximum distance that the webpage 12 can be adjusted along the adjustment direction can be defined as Y, and Y<X. Thus, in this embodiment, the webpage 12 can be adjusted upwards Y with respect to the display screen 11, and FIG. 9B is an exemplary schematic diagrams of a display screen in landscape mode after the adjustment, wherein the webpage 12 has moved the maximum distance Y, and cannot be moved upwards further with respective to the display screen 11. The webpage canvas 13 can then be moved upwards with respective to the display screen 11 and webpage 12 for no less than (X−Y) so that the adjusted input box 131 on the webpage canvas 13 is within the webpage viewable area 112 of the display screen 11 as shown in FIG. 9C.

Preferably, in Step 805, the adjustment module 73 adjusts the webpage 12 and webpage canvas 13 so that the adjusted input box 131 is at a preset position of the webpage viewable area 112 of the display screen 11, such as the lower side or the upper side of the webpage viewable area 112, that minimizes the interference with the user's viewing of the webpage and enhances the user's web browsing experience.

The method for adjusting an input box in a display screen in this embodiment completes here.

In accordance with this embodiment of the present invention, when the display mode of a display screen is switched, the adjustment module 73 automatically adjusts the webpage in accordance with the distance between the input box and the webpage viewable area so that the input box is within the webpage viewable area, which improves the user's web browsing experience.

How to detect the position of an input box in accordance with the embodiments of the present invention will be further described in connection with two examples.

Figure 10:
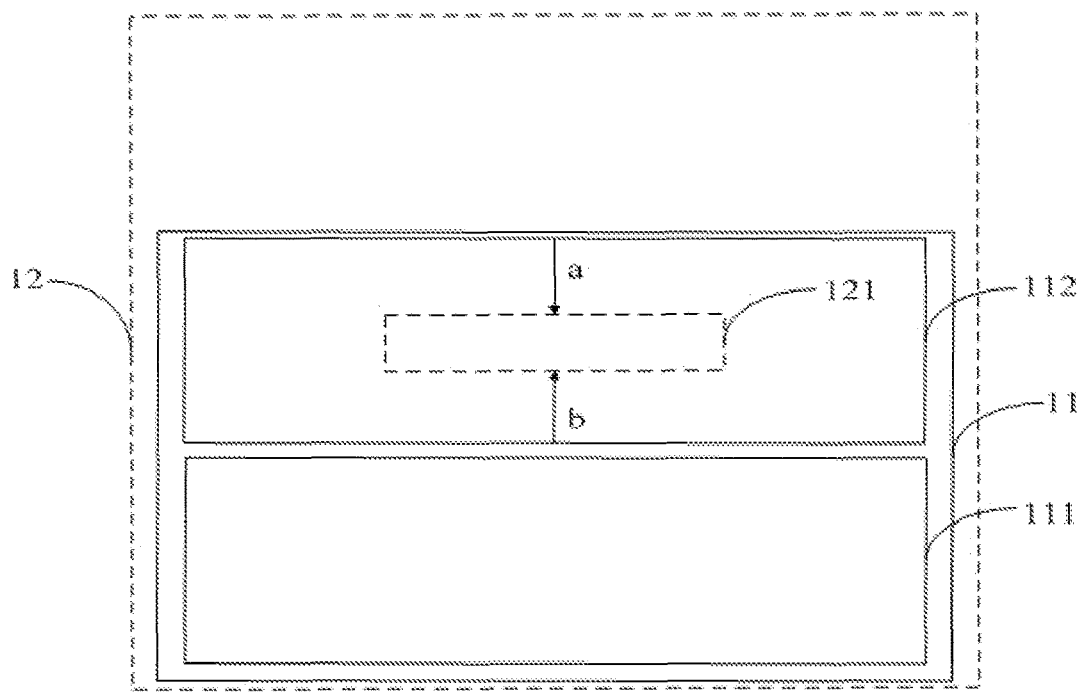
FIG. 10 is an exemplary schematic diagram for detecting the position of an input box in accordance with yet another embodiment of the present invention.

FIG. 10 is an exemplary schematic diagram for detecting the position of an input box in accordance with yet another embodiment of the present invention. As shown in FIG. 10, the distance between the upper edge of the webpage viewable area of the display screen and the upper edge of the input box in the webpage is a, and the distance between the lower edge of the webpage viewable area of the display screen and the lower edge of the input box in the webpage is b.

When the position acquisition module detects the position of the input box within the webpage (including detecting the position of the input box within the webpage and the webpage canvas), if both a and b are larger than 0, the input box is within the webpage viewable area of the display screen, and the adjustment module does not need to adjust the webpage; if a is less than 0 (i.e., the upper edge of the input box in the webpage is above the upper edge of the webpage viewable area of the display screen), input box in the webpage is above the webpage viewable area of the display screen, and the adjustment module can move the webpage and webpage canvas down with respective to the display screen so that the adjusted input box is within the webpage viewable area (a is larger than 0); if b is less than 0 (i.e., the lower edge of the input box in the webpage is below the lower edge of the webpage viewable area of the display screen), the input box in the webpage is below the webpage viewable area of the display screen, and the adjustment module can move the webpage and webpage canvas up with respective to the display screen so that the adjusted input box is within the webpage viewable area (b is larger than 0). Both a and b can be set as so that the input box is at a preset position of the webpage viewable area.

Figure 11:
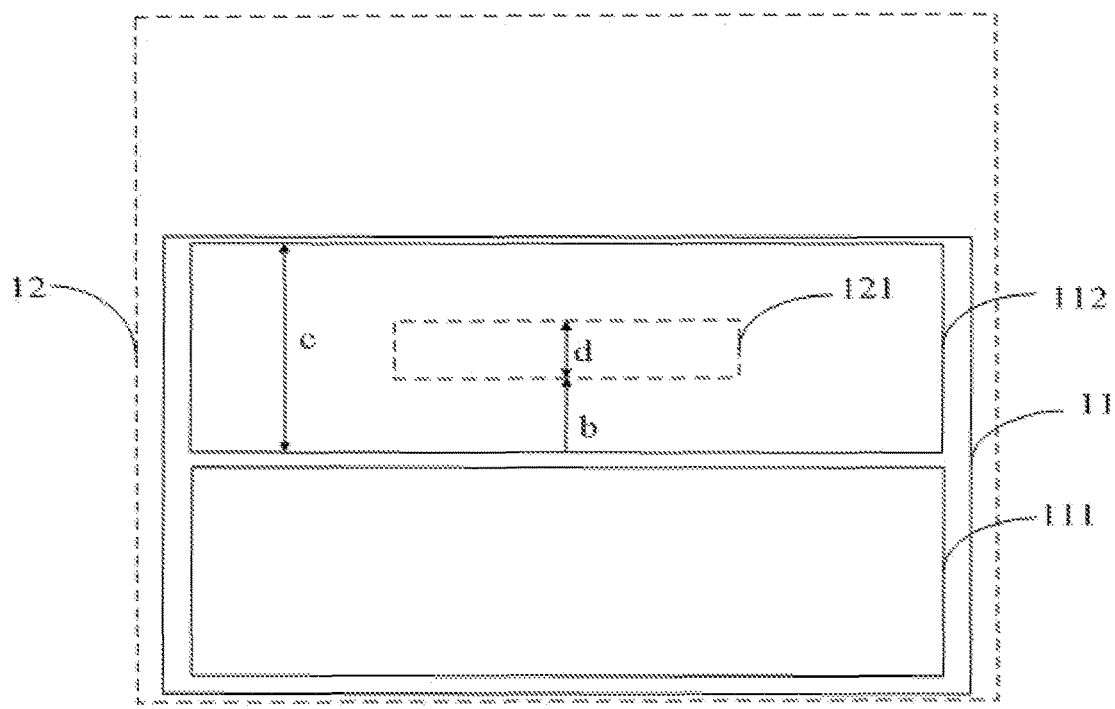
FIG. 11 is an exemplary schematic diagram for detecting the position of an input box in accordance with yet another embodiment of the present invention.

FIG. 11 is an exemplary schematic diagram for detecting the position of an input box in accordance with yet another embodiment of the present invention. As shown in FIG. 11, the distance between the lower edge of the webpage viewable area of the display screen and the lower edge of the input box in the webpage is b; the height of the webpage viewable area of the display screen is c, and the height of the input box is d.

When the position acquisition module detects the position of the input box within the webpage (including detecting the position of the input box within the webpage and the webpage canvas), if both b is larger than 0 and (b+d) is less than c, then the input box is within the webpage viewable area of the display screen, and the adjustment module does not need to adjust the webpage; if (b+d) is larger than c (i.e., the upper edge of the input box in the webpage is above the upper edge of the webpage viewable area of the display screen), input box in the webpage is above the webpage viewable area of the display screen, and the adjustment module can move the webpage and webpage canvas down with respective to the display screen so that the adjusted input box is within the webpage viewable area ((b+d) is less than c); if b is less than 0 (i.e., the lower edge of the input box in the webpage is below the lower edge of the webpage viewable area of the display screen), the input box in the webpage is below the webpage viewable area of the display screen, and the adjustment module can move the webpage and webpage canvas up with respective to the display screen so that the adjusted input box is within the webpage viewable area (b is larger than 0). The value b can be set as so that the input box is at a preset position of the webpage viewable area In accordance with the embodiments of the present invention, the position of the input box can be adjusted based on a, b, c and/or d, but other parameters, such as the height of the input area and the height of the display screen, can also be used, and the embodiments of the present invention are not limited to the use of any particular parameter or combination thereof.

In accordance with embodiments of the present invention, when the display mode of a display screen is switched, the webpage is automatically adjusted in accordance with the distance between the input box and the webpage viewable area so that the input box is within the webpage viewable area, which improves the user's web browsing experience, and addresses the issue in the prior art where the input box is not being properly adjusted during the switch of display mode, causing inconvenience to the user.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

The various functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for automatically adjusting an input box in a webpage displayed on a display screen during display mode switch, the method comprising:

detecting whether a display mode of the display screen is switched between a first display mode and a second display mode, wherein the display screen has an input area, a first viewable area under the first display mode, and a second viewable area under the second display mode, and content of the webpage displayed in the first viewable area is different from content of the webpage displayed in the second viewable area;

upon detecting the display mode of the display screen being switched from the first display mode to the second display mode, obtaining a position of the input box in the webpage, wherein the input box is used to receive an input entered from the input area of the display screen by a user;

based on the position of the input box, determining whether the input box is outside the second viewable area of the display screen; and after it is determined that the input box is outside the second viewable area of the display screen, moving both of the webpage and a canvas of the webpage in accordance with a distance between the input box and the second viewable area, such that the input box is within the second viewable area and is viewable to the user for input after the display mode switch, wherein the first display mode includes a portrait mode, and the second display mode includes a landscape mode, and wherein the webpage has an edge, and the step of adjusting the webpage and a canvas of the webpage in accordance with a distance between the input box and the second viewable area comprises:

determining a maximum distance that the webpage can be adjusted along an adjustment direction without showing the edge of the webpage;

determining whether the maximum distance is less than the distance between the input box and the second viewable area;

after it is determined that the maximum distance is less than the distance between the input box and the second viewable area, determining a second distance to be adjusted along the adjust direction for the canvas in accordance with the distance between the input box and the second viewable area and the maximum distance; and moving the webpage in accordance with the determined maximum distance and moving the canvas in accordance with the second distance such that the input box is within the second viewable area.

2. The method of claim 1, wherein the input area includes a soft keyboard.

3. The method of claim 1, wherein the webpage and the canvas are adjusted such that the input box is at a preset position of the second viewable area.

4. The method of claim 1, wherein the input area of the display screen comprises a soft keyboard for inputting data, and the adjusted input box is above the soft keyboard such that the input box shows the data inputted trough the soft keyboard.

5. An apparatus for automatically adjusting an input box in a webpage displayed on a display screen during display mode switch, comprising:
    a memory storing instructions; and
    a processor coupled to the memory and, when executing the instructions, configured for:
    detecting whether a display mode of the display screen is switched between a first display mode and a second display mode, wherein the display screen has an input area, a first viewable area under the first display mode, and a second viewable area under the second display mode, and content of the webpage displayed in the first viewable area is different from content of the webpage displayed in the second viewable area;
    upon detecting the display mode of the display screen being switched from the first display mode to the second display mode, obtaining a position of the input box in the webpage, wherein the input box is used to receive an input entered from the input area of the display screen by a user; and
    after it is determined that the input box is outside the second viewable area of the display screen, moving both of the webpage and a canvas of the webpage in accordance with a distance between the input box and the second viewable area, such that the input box is within the second viewable area and is viewable to the user for input after the display mode switch,
    wherein the first display mode includes a portrait mode, and the second display mode includes a landscape mode, and
    wherein the webpage has an edge, and the processor is further configured for:
    determining a maximum distance that the webpage can be adjusted along an adjustment direction without showing the edge of the webpage;
    determining whether the maximum distance is less than the distance between the input box and the second viewable area;
    after it is determined that the maximum distance is less than the distance between the input box and the second viewable area, determining a second distance to be adjusted along the adjust direction for the canvas in accordance with the distance between the input box and the second viewable area and the maximum distance; and
    moving the webpage in accordance with the determined maximum distance and moving the canvas in accordance with the second distance such that the input box is within the second viewable area.

6. The apparatus of claim 5, wherein the input area includes a soft keyboard.

7. The apparatus of claim 5, wherein the webpage is adjusted such that the input box is at a preset position of the second viewable area.

8. The apparatus of claim 5, wherein the input area of the display screen comprises a soft keyboard for inputting data, and the adjusted input box is above the soft keyboard such that the input box shows the data inputted trough the soft keyboard.

9. A non-transitory computer-readable storage medium containing computer-executable instructions for, when executed by a processor, performing a method for automatically adjusting an input box in a webpage displayed on a display screen during display mode switch, the method comprising:
    detecting whether a display mode of the display screen is switched between a first display mode and a second display mode, wherein the display screen has an input area, a first viewable area under the first display mode, and a second viewable area under the second display mode, and content of the webpage displayed in the first viewable area is different from content of the webpage displayed in the second viewable area;
    upon detecting the display mode of the display screen being switched from the first display mode to the second display mode, obtaining a position of the input box in the webpage, wherein the input box is used to receive an input entered from the input area of the display screen by a user;
    based on the position of the input box, determining whether the input box is outside the second viewable area of the display screen; and
    after it is determined that the input box is outside the second viewable area of the display screen, moving both of the webpage and a canvas of the webpage in accordance with a distance between the input box and the second viewable area, such that the input box is within the second viewable area and is viewable to the user for input after the display mode switch,
    wherein the first display mode includes a portrait mode, and the second display mode includes a landscape mode, and
    wherein the webpage has an edge, and the step of adjusting the webpage and a canvas of the webpage in accordance with a distance between the input box and the second viewable area comprises:

determining a maximum distance that the webpage can be adjusted along an adjustment direction without showing the edge of the webpage;

determining whether the maximum distance is less than the distance between the input box and the second viewable area;

after it is determined that the maximum distance is less than the distance between the input box and the second viewable area, determining a second distance to be adjusted along the adjust direction for the canvas in accordance with the distance between the input box and the second viewable area and the maximum distance; and moving the webpage in accordance with the determined maximum distance and moving the canvas in accordance with the second distance such that the input box is within the second viewable area.

10. The non-transitory computer-readable storage medium of claim 9, wherein the input area includes a soft keyboard.

11. The non-transitory computer-readable storage medium of claim 9, wherein the webpage and the canvas are adjusted such that the input box is at a preset position of the second viewable area.

12. The non-transitory computer-readable storage medium of claim 9, wherein the input area of the display screen comprises a soft keyboard for inputting data, and the adjusted input box is above the soft keyboard such that the input box shows the data inputted trough the soft keyboard.

\* \* \* \* \*